United States Patent [19]

Sin

[11] Patent Number: 5,544,133
[45] Date of Patent: Aug. 6, 1996

[54] RECORDING/REPRODUCING APPARATUS USING OPTICAL MAGNETIC TAPE

[75] Inventor: Hyun-kuk Sin, Kyunggi-do, Rep. of Korea

[73] Assignee: SamSung Electronics Co., Ltd., Kyungki-do, Rep. of Korea

[21] Appl. No.: 896,434

[22] Filed: Jun. 10, 1992

[30] Foreign Application Priority Data

Oct. 23, 1991 [KR] Rep. of Korea .................. 91-18683

[51] Int. Cl.⁶ .................................................. G11B 13/00
[52] U.S. Cl. .......................... 369/14; 369/15; 369/275.3; 360/93; 360/134
[58] Field of Search .................. 369/13, 14, 15, 369/273, 275.1, 275.3, 44.17, 97; 360/90, 93, 134, 132

[56] References Cited

U.S. PATENT DOCUMENTS

| | | | |
|---|---|---|---|
| 4,661,941 | 4/1987 | Bell et al. | 369/111 |
| 4,669,070 | 5/1987 | Bell | 369/32 |
| 4,901,297 | 2/1990 | Komatsu et al. | 369/13 |
| 4,937,810 | 6/1990 | Drexler et al. | 369/275.1 |
| 4,999,827 | 3/1991 | Miyaoka | 369/97 |
| 5,120,136 | 6/1992 | Oakley | 369/97 |
| 5,140,566 | 8/1992 | Kang et al. | 369/13 |
| 5,321,683 | 6/1994 | Olczak | 369/112 |

FOREIGN PATENT DOCUMENTS

| | | |
|---|---|---|
| 57-143741 | 9/1982 | Japan. |
| 2217510 | 10/1989 | United Kingdom ............ 369/15 |

*Primary Examiner*—Georgia Y. Epps
*Assistant Examiner*—Tan Dinh
*Attorney, Agent, or Firm*—Robert E. Bushnell, Esq.

[57] ABSTRACT

A recording/reproducing apparatus using optical magnetic tape, comprises an objective lens for focusing the light generated from a light source, and an acousto optic scanner and an ultrasonic wave generator for vertically or horizontally displacing the focal point of the objective lens in order to scan a light beam onto the optical magnetic tape transferred along the outer periphery of a rotating drum. According to the disclosed principles, recording/reproducing at high speeds is possible, and a high data-transmission speed is obtained with a low rotating speed of the rotating drum, so that the instrument is stabile, small, and simple in construction.

45 Claims, 2 Drawing Sheets

5,544,133

RECORDING/REPRODUCING APPARATUS USING OPTICAL MAGNETIC TAPE

BACKGROUND OF THE INVENTION

1. Field of the Invention

The present invention relates to an apparatus for recording optical information to, and reproducing optical information from, an optical magnetic tape, and to the track structure for such an apparatus.

2. Description of Related Art

Optical magnetic recording has a number of advantages over magnetic recording techniques such as higher recording density, higher reliability due to the lack of contact between the head and recording media, and longer recording medium life. These advantages have made compact disks and laser disks popular. Optical magnetic disks, however, have a limited data capacity making them inappropriate for recordation of video signals or other types of information processing requiring a large capacity. Compact disks (CD) have low data-transmission speeds making the processing of moving pictures difficult. Similarly, a laser disk (LD) can only store approximately one hour of an analog video signal. Therefore, optical magnetic tape which has a large data-capacity is required for digital VCRs having high picture quality.

Conventional apparatus for recording and reproducing optical information using optical magnetic tape have drawbacks. When information is helically recorded on the optical magnetic tape, data-transmission speed is determined by the rotating speed of a drum carrying the optical magnetic tape. Therefore, to achieve a high data-transmission speed, the drum's rotating speed should be high and its size should be large, decreasing stability and increasing noise. Moreover, tracks lengths are long, stretching diagonally across the width of the optical magnetic tape, thereby making it difficult to keep the tape flat for the entire width of the track. Furthermore, since the scanning angle is small, the focal length of objective lens should be long and the diameter of the scanning laser beam should be large, enlarging and/or complicating the apparatus.

SUMMARY OF THE INVENTION

It is therefore, one object of the present invention to provide an improved recording/reproducing apparatus using optical magnetic tape.

Another object is to provide an optical recording/reproducing apparatus which has a high data-transmission speed but low drum rotating speed.

Still another object is to provide an apparatus which can be simplified and miniaturized.

Yet another object is to provide a track structure in which track lengths are shortened.

To achieve these and other objects, the present invention provides a recording/reproducing apparatus using an optical magnetic tape in which a supply reel and a takeup reel of the optical magnetic tape are located in a rotating drum having a slot on a peripheral surface and on upper and lower parts of a single axis. The optical magnetic tape is transferred between these reels along the outer periphery of the rotating drum while in contact therewith between the two reels. The apparatus contemplates an optical system for focusing light on the optical magnetic tape on that outer periphery. The optical system comprises a light source, an objective lens for focusing the light generated from the light source on the optical magnetic tape, an optical scanner for vertically or horizontally displacing the focal point of the objective lens with respect to the light path between the light source and the objective lens, a beam splitter for separating incident light and reflected light from the light path between the objective lens and the optical scanner, and a light detecting element for detecting the separated reflected light.

BRIEF DESCRIPTION OF THE DRAWINGS

The above, and other objects, features, and advantages of the present invention, will become apparent from the following description taken in conjunction with the accompanying drawings wherein like references designate like elements, in which.

DETAILED DESCRIPTION OF THE DRAWINGS

Figure 1A:
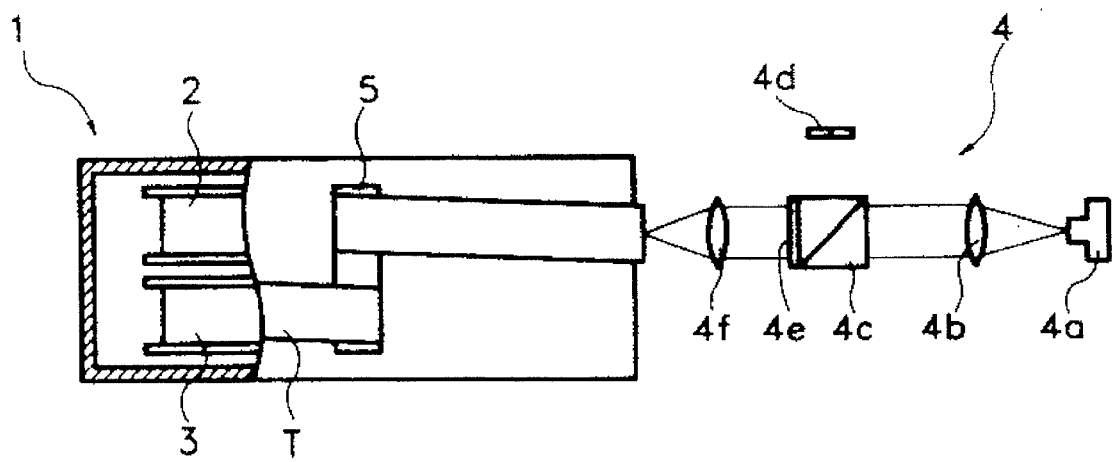
FIGS. 1A and 1B are schematic diagrams of a recording/reproducing apparatus using a conventional optical magnetic tape.

Turning now to the drawings, in FIG. 1A illustrating a conventional optical magnetic tape cassette, a supply reel 2 and a takeup reel 3 are installed on one axis in upper and lower inner sections of a rotating drum 1. Due to the rotation of drum 1, an optical magnetic tape T starting from supply reel 2 is helically wound around the outer periphery of drum 1 via a slot 5 formed in its outer casing, and then wound onto takeup reel 3. During this transfer, the optical information is helically recorded on or reproduced from the optical magnetic tape T by an optical system 4 including a light source 4a, a convex lens 4b, a beam splitter 4c, a photodetecting element 4d, a quarter wavelength plate 4e, and an objective lens 4f.

Figure 1B:
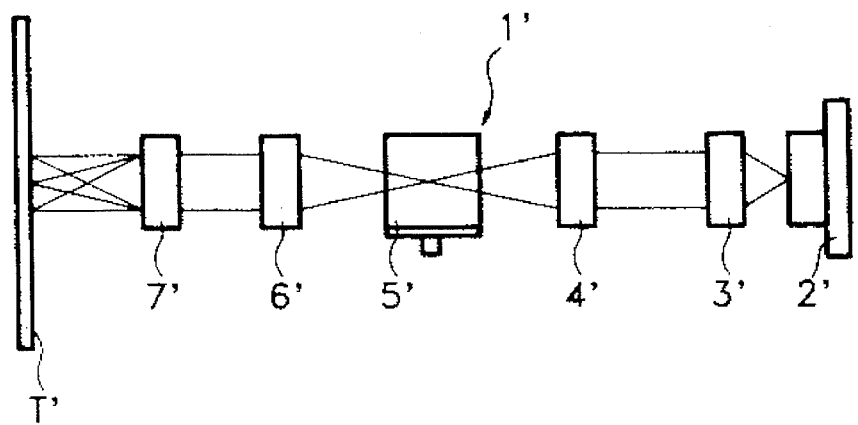

In FIG. 1B illustrating a conventional optical system, optical information is recorded and reproduced transversely on an optical magnetic tape T' moving horizontally by an optical system 1' including a light source 2', a collimating lens 3', a convex lens 4', an acousto optic scanner 5', a cylindrical lens 6' and an objective lens 7'.

Figure 2:
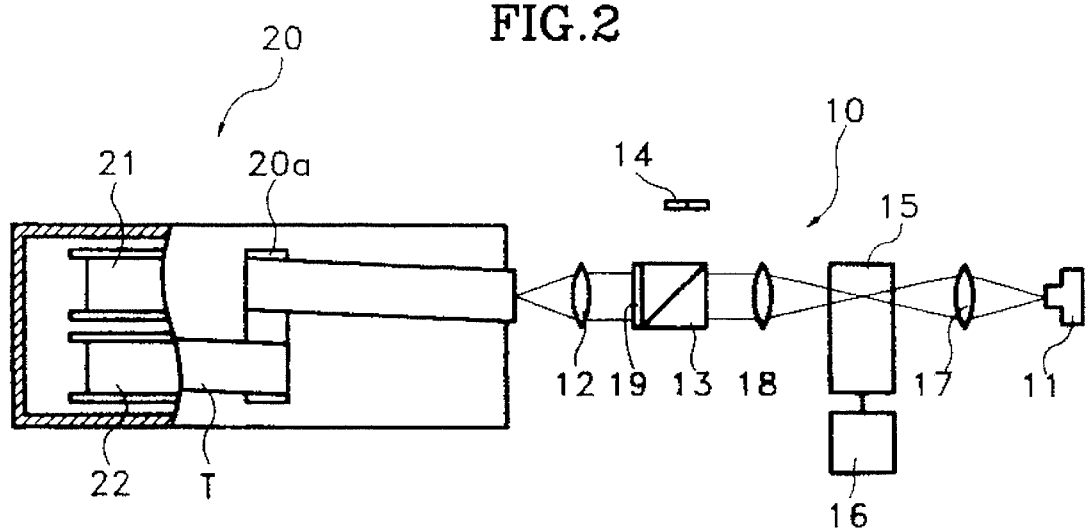
FIG. 2 is a schematic diagram of a recording/reproducing apparatus using an optical magnetic tape according to the present invention.

Referring now to FIG. 2, a recording/reproducing apparatus using optical magnetic tape according to the present invention is shown with a rotary drum 20 and an optical system 10. A supply reel 21 and a takeup reel 22 for the optical magnetic tape have coinciding, coaxial axes of rotation and are disposed in upper and lower sections within the rotary drum 20. A slot 20a is formed in the surface of the periphery of rotary drum 20. Via slot 20a, an optical magnetic tape T moves onto the outer peripheral surface while in contact with that outer peripheral surface. Optical system 10 focuses and scans light onto the optical magnetic tape T as it moves across this peripheral surface.

In FIG. 2, optical system 10 is configured with a light source 11, an objective lens 12 focusing the light generated from light source 11 onto optical magnetic tape T, an optical scanner 15, 16 moving the focal point of objective lens 12 on the light path between light source 11 and objective lens 12, a beam splitter 13 for separating the incident light and the reflected light on the light path between objective lens 12 and the optical scanner, and a light detecting element 14 for detecting the separated reflected light. Reference numeral 17 is a convex lens, 18 is a cylindrical lens, and 19 is a quarter-phase plate.

The optical scanner includes an acousto optical scanner 15 and an ultrasonic wave generator 16 operating the acousto optic scanner. Instead of the acousto optic scanner 15, the optical scanner can alternatively incorporate a holographic scanner, a polygonal mirror or a scanner having a mirror attached to piezoelectric material.

Figure 3A:
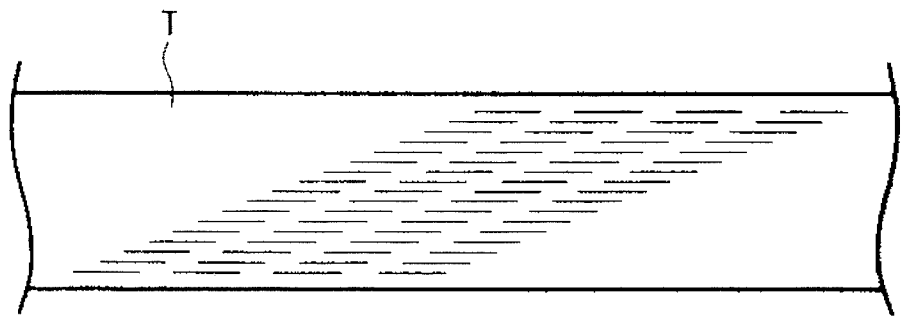
FIGS. 3A and 3B are schematic diagrams of the recording format on the recording/reproducing apparatus using the optical magnetic tape according to the present invention.
Figure 3B:
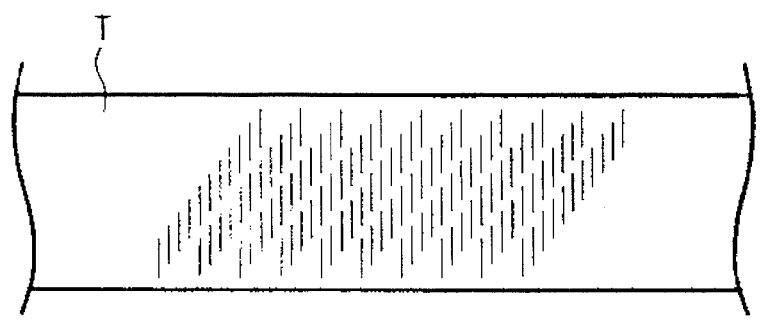

The recording/reproducing apparatus having the optical magnetic tape according to the present invention uses rotary drum 20 and acousto optic scanner 15 simultaneously. Here, rotating drum 20 and the state of optical magnetic tape T wound around rotary drum 20 are similar to those illustrated in FIG. 1A. The track recorded onto the optical magnetic tape have lengths of, for example, 100 or 200 μm. Each track represents the short horizontal or vertical lines shown in FIGS. 3A and 3B, respectively. Successive tracks may constitute the diagonally arranged groups of FIGS. 3A and 3B. Because the track lengths are quite short, an objective lens 12 from a typical compact disk can be used. Also, the tape can retain a flat surface when the track length is 100 or 200 μm, so that focusing by objective lens 12 is uniform.

The recording/reproducing apparatus using the optical magnetic tape constructed above, operates as follows. After rotating drum 20 is rotated by a driving device (not shown), optical magnetic tape T is supplied to the outer peripheral surface of rotating drum 20 via slot 20a from supply reel 21, and at the same time, light source 11 of optical system 10 is operated to generate light.

The light generated from light source 11 is focused on acousto optic scanner 15 by convex lens 17 and collimated by cylindrical lens 18, then passes through beam splitter 13 to be focused onto optic magnetic tape T by objective lens 12. At this time, acousto optic scanner 15 is operated by ultrasonic wave generator 16 to either vertically or horizontally deflect the light focused by convex lens 17 within the predetermined track length, so that the information is recorded or reproduced on optical magnetic tape T in the form illustrated in FIGS. 3A and 3B. Therefore, by a slow rotating speed of rotating drum 20, recording/reproducing at high speeds is possible.

By beam splitter 13, the light reflected from optical magnetic tape T is scanned to photodetecting element 14 which detects the tracking and focusing error from the reflected light.

As described above, the recording/reproducing apparatus using the optical magnetic tape according to the principles of the present invention, performs recording and reproducing when the focus of the objective lens is deflected vertically or horizontally by an acousto optic scanner. Compared with the conventional apparatus, the present invention enables recording and reproducing at high speeds, and with a low rotating speed of the rotating drum, to obtain high data-transmission speeds.

What is claimed is:

1. A recording and reproducing apparatus, comprising:

a rotating drum having a slot formed in a peripheral surface;

a supply reel disposed in a first section of said rotating drum;

a takeup reel having an axis of rotation coinciding with an axis of rotation of said supply reel and disposed in a second section of said rotating drum;

optical magnetic tape adapted to be transferred between said supply reel and said takeup reel by passing through said slot and along an outer periphery of said rotating drum; and an optical system for focusing light onto said optical magnetic tape, comprising:

a light source for generating light;

an objective lens for focusing said light generated by said light source onto said optical magnetic tape;

an optical scanner for moving a focal point of said objective lens across said optical magnetic tape;

a beam splitter for separating light received from said light source and light reflected from said optical magnetic tape; and a light detecting element for detecting the separated light.

2. A recording/reproducing apparatus as claimed in claim 1, wherein said optical scanner comprises an acousto optic scanner and an ultrasonic wave generator for driving said acousto optic scanner.

3. A recording/reproducing apparatus as claimed in claim 2, wherein focal lines of said objective lens defining tracks of said optical magnetic tape are formed vertically by said acousto optic scanner.

4. A recording/reproducing apparatus as claimed in claim 3, wherein said tracks are less than a millimeter long.

5. A recording/reproducing apparatus as claimed in claim 2, wherein focal lines of said objective lens defining tracks of said optical magnetic tape are formed horizontally by said acousto optic scanner.

6. A recording/reproducing apparatus as claimed in claim 5, wherein said tracks are less than a millimeter long.

7. A recording/reproducing apparatus as claimed in claim 1, wherein tracks of said optical magnetic tape are formed horizontally.

8. A recording/reproducing apparatus as claimed in claim 7, wherein successive tracks are diagonally disposed relative to each other across a width of said optical magnetic tape.

9. A recording/reproducing apparatus as claimed in claim 8, wherein said tracks are less than a millimeter long.

10. A recording/reproducing apparatus as claimed in claim 1, wherein tracks of said optical magnetic tape are formed vertically.

11. A recording/reproducing apparatus as claimed in claim 10, wherein successive tracks are diagonally disposed relative to each other across a width of said optical magnetic tape.

12. A recording/reproducing apparatus as claims 11, wherein said tracks are less than a millimeter long.

13. An optical magnetic tape data storage device, comprising:

a supply reel;

a takeup reel;

optical magnetic tape adapted to be transferred between said supply reel and said takeup reel;

an optical magnetic tape transport for driving said supply reel and said takeup reel to transfer said optical magnetic tape; and an optical system for recording information by forming tracks on said optical magnetic tape and for reproducing data from said tracks by focusing light onto said optical magnetic tape, said tracks of said optical magnetic tape being formed horizontally less than a millimeter long.

14. An optical magnetic tape data storage device as claimed in claims 13, wherein successive tracks are diagonally disposed relative to each other across a width of said optical magnetic tape.

15. An optical magnetic tape data storage device, comprising:

a supply reel;

a takeup reel;

optical magnetic tape adapted to be transferred between said supply reel and said takeup reel, said optical magnetic tape having vertically formed tracks less than a millimeter in length;

an optical magnetic tape transport for driving said supply reel and said takeup reel to transfer said optical magnetic tape; and an optical system for focusing light onto said optical magnetic tape.

16. An optical magnetic tape data storage device as claimed in claim 15, wherein successive tracks are diagonally disposed relative to each other across a width of said optical magnetic tape.

17. An optical magnetic tape data storage device as claimed in claim 16, wherein said tracks are between 100 and 200 μm long.

18. A recording/reproducing apparatus as claimed in claim 3, wherein said tracks are between 100 and 200 μm long.

19. A recording/reproducing apparatus as claimed in claim 5, wherein said tracks are between 100 and 200 μm long.

20. A recording/reproducing apparatus as claimed in claim 8, wherein said tracks are between 100 and 200 μm long.

21. A recording/reproducing apparatus as claimed in claim 11, wherein said tracks are between 100 and 200 μm long.

22. A method for forming tracks on an optical magnetic tape, said method comprising the steps of:

transporting said optical magnetic tape between a supply reel and a takeup reel; and forming a plurality of tracks horizontally on said optical magnetic tape, each of said tracks being less than a millimeter long.

23. A method for forming tracks on a optical magnetic tape according to claim 22, wherein successive tracks are diagonally disposed relative to each other across a width of said optical magnetic tape.

24. A method for forming tracks on an optical magnetic tape, comprising the steps of:

transporting said optical magnetic tape between a supply reel and a takeup reel; and forming tracks perpendicular to a longitudinal direction of said optical magnetic tape on said optical magnetic tape, successive ones of said tracks being diagonally disposed relative to each other across a width of said optical magnetic tape.

25. A method for forming tracks on a optical magnetic tape according to claim 24, wherein said tracks are less than a millimeter long.

26. A method for forming tracks on a optical magnetic tape according to claim 25, wherein said tracks are between 100 and 200 μm long.

27. An optical magnetic tape cassette, comprising:

a supply reel;

a takeup reel;

optical magnetic tape adapted to be transferred between said supply reel and said takeup reel and having tracks parallel to a lengthwise direction of said optical magnetic tape, with successive tracks being diagonally disposed relative to each other across a width of said optical magnetic tape; and a housing having said supply reel and said takeup reel disposed therein.

28. An optical magnetic tape cassette according to claim 27, wherein said tracks are less than a millimeter long.

29. An optical magnetic tape cassette, comprising:

a supply reel;

a takeup reel;

optical magnetic tape adapted to be transferred between said supply reel and said takeup reel and having tracks perpendicular to a lengthwise direction of said optical magnetic tape, said tracks are less than a millimeter long; and a housing having said supply reel and said takeup reel disposed therein.

30. An optical magnetic tape cassette according to claim 29, wherein said tracks are between 100 and 200 μm long.

31. An optical magnetic tape cassette according to claim 30, wherein successive tracks are diagonally disposed relative to each other across a width of said optical magnetic tape.

32. A recording/reproducing apparatus, comprising:

a supply reel;

a takeup reel;

an optical magnetic tape adapted to be transferred between said supply reel and said takeup reel;

an optical magnetic tape transport for driving said supply reel and said takeup reel to transfer said optical magnetic tape; and an optical system for focusing light onto said optical magnetic tape; tracks of less than a millimeter in length of said optical magnetic tape being formed horizontally or vertically.

33. The recording/reproducing apparatus as claimed in claim 32, wherein successive tracks are diagonally disposed relative to each other across a width of said optical magnetic tape.

34. The recording/reproducing apparatus as claimed in claim 32, wherein said optical magnetic tape transport comprises:

a rotating drum having a slot formed in a peripheral surface;

said supply reel being disposed in a first section of said rotating drum;

said takeup reel having an axis of rotation coinciding with an axis of rotation of said supply reel and disposed in a second section of said rotating drum;

said optical magnetic tape passing through said slot and along an outer periphery of said rotating drum; and said optical system for focusing light onto said optical magnetic tape comprises: a light source for generating light;

an objective lens for focusing said light generated by said light source onto said optical magnetic tape;

an optical scanner for moving a focal point of said objective lens across said optical magnetic tape;

a beam splitter for separating light received from said light source and light reflected from said optical magnetic tape; and a light detecting element for detecting the separated light.

35. The recording/reproducing apparatus as claimed in claim 34, wherein said optical scanner comprises an acousto optic scanner and an ultrasonic wave generator for driving said acousto optic scanner.

36. A recording/reproducing apparatus, comprising:

a supply reel;

a takeup reel;

optical magnetic tape adapted to be transferred between said supply reel and said takeup reel;

an optical magnetic tape transport for driving said supply reel and said takeup reel to transfer said optical magnetic tape; and an optical system for focusing light onto said optical magnetic tape, comprising:
- a light source for generating light;
- an objective lens for focusing said light generated by said light source onto said optical magnetic tape;
- an optical scanner for moving a focal point of said objective lens across said optical magnetic tape;
- a beam splitter for separating light received from said light source and light reflected from said optical magnetic tape; and
- a light detecting element for detecting the separated light;

said tracks of said optical magnetic tape being formed horizontally or vertically, and successive ones of said tracks are diagonally disposed relative to each other across a width of said optical magnetic tape.

37. The recording/reproducing apparatus as claimed in claim 36, wherein said tracks are less than a millimeter long.

38. The recording/reproducing apparatus as claimed in claim 36, wherein said optical magnetic tape transport comprises:

- a rotating drum having a slot formed in a peripheral surface;
- said supply reel being disposed in a first section of said rotating drum;
- said takeup reel having an axis of rotation coinciding with an axis of rotation of said supply reel and disposed in a second section of said rotating drum; and
- said optical magnetic tape passing through said slot and along an outer periphery of said rotating drum.

39. The recording/reproducing apparatus as claimed in claim 36, wherein said optical scanner comprises an acousto optic scanner and an ultrasonic wave generator for driving said acousto optic scanner.

40. The recording/reproducing apparatus as claimed in claim 38, wherein said optical scanner comprises an acousto optic scanner and an ultrasonic wave generator for driving said acousto optic scanner.

41. A method for recording or reproducing data in successive tracks on an optical magnetic tape, said successive tracks being diagonally disposed relative to each other across a width of said optical magnetic tape, said method comprising the steps of:

transporting said optical magnetic tape between a supply reel and a takeup reel disposed in a rotating drum;

deflecting light, from a light source, either horizontally or vertically within a predetermined track length less than a millimeter in length; and focusing said light on said optical magnetic tape for recording or reproducing said data.

42. The method as claimed in claim 41, wherein said deflecting step deflects said light horizontally.

43. The method as claimed in claim 41, wherein said deflecting step deflects said light vertically.

44. A recording/reproducing apparatus, comprising:

a supply reel;

a takeup reel;

an optical magnetic tape adapted to be transferred between said supply reel and said takeup reel;

an optical magnetic tape transport for driving said supply reel and said takeup reel to transfer said optical magnetic tape; and an optical system for forming tracks of said optical magnetic tape along a selected one of a horizontal direction and a vertical direction by focusing light onto said optical magnetic tape, said vertical direction being substantially perpendicular to said horizontal direction;

tracks of said optical magnetic tape being formed horizontally or vertically, said tracks being between 100 and 200 μm in length.

45. A recording/reproducing apparatus, comprising:

a supply reel;

a takeup reel;

optical magnetic tape adapted to be transferred between said supply reel and said takeup reel;

an optical magnetic tape transport for driving said supply reel and said takeup reel to transfer said optical magnetic tape; and an optical system for focusing light onto said optical magnetic tape, comprising:
- a light source for generating light;
- an objective lens for focusing said light generated by said light source onto said optical magnetic tape;
- an optical scanner for moving a focal point of said objective lens across said optical magnetic tape;
- a beam splitter for separating light received from said light source and light reflected from said optical magnetic tape; and
- a light detecting element for detecting the separated light;

tracks between 100 and 200 μm long on said optical magnetic tape being formed horizontally or vertically by said optical system.

* * * * *